US008200815B1

(12) United States Patent
Prasad et al.

(10) Patent No.: US 8,200,815 B1
(45) Date of Patent: *Jun. 12, 2012

(54) METHOD AND APPARATUS FOR NETWORK SERVICES METERING

(75) Inventors: Aditya K. Prasad, Seattle, WA (US);
Sorin Gherman, Kirkland, WA (US);
Alan S. Geller, Redmond, WA (US);
Rahul Singh, Seattle, WA (US);
Nicholas J. Lee, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 15 days.

This patent is subject to a terminal disclaimer.

(21) Appl. No.: 13/040,986

(22) Filed: Mar. 4, 2011

Related U.S. Application Data

(63) Continuation of application No. 11/396,402, filed on Mar. 31, 2006, now Pat. No. 7,908,358.

(51) Int. Cl.
*G06F 15/173* (2006.01)
(52) U.S. Cl. .............. 709/224; 709/223
(58) Field of Classification Search .......... 709/224, 709/223
See application file for complete search history.

(56) References Cited

U.S. PATENT DOCUMENTS

| | | | |
|---|---|---|---|
| 6,418,467 B1 | 7/2002 | Schweitzer et al. | |
| 7,024,468 B1 | 4/2006 | Meyer et al. | |
| 7,092,696 B1 | 8/2006 | Hosain et al. | |
| 7,099,940 B2 | 8/2006 | Givoly | |
| 7,124,180 B1 | 10/2006 | Ranous | |
| 7,136,467 B2 | 11/2006 | Brockman et al. | |
| 7,293,083 B1 | 11/2007 | Ranous et al. | |
| 2003/0097564 A1 | 5/2003 | Tewari et al. | |
| 2004/0039809 A1* | 2/2004 | Ranous et al. | 709/223 |
| 2005/0125314 A1* | 6/2005 | Agarwal et al. | 705/30 |
| 2005/0138163 A1 | 6/2005 | Schweitzer et al. | |
| 2005/0223089 A1 | 10/2005 | Rhodes | |
| 2006/0233166 A1* | 10/2006 | Bou-Diab et al. | 370/389 |

OTHER PUBLICATIONS

Motegi, S.; Yoshihara, K.; Horiuchi, H.; , "DAG based in-network aggregation for sensor network monitoring," Jan. 2006, IEEE Publication, Applications and the Internet, 2006. SAINT 2006. International Symposium on, Phoenix, AZ, p. 1-8.*
Agarwal et al., "An Information model for metering and accounting", Apr. 2004, IEEE Publication, Proceedings of the IEEE/IFIP Network Operations and Management Symposium 2004, vol. 1, Seoul, South Korea, p. 541-554.*

* cited by examiner

*Primary Examiner* — Jeffrey R Swearingen
*Assistant Examiner* — Taylor Elfervig
(74) *Attorney, Agent, or Firm* — Robert C. Kowert; Meyertons, Hood, Kivlin, Kowert & Goetzel, P.C.

(57) ABSTRACT

Method and apparatus for metering network services, for example Web services. In embodiments, a network services metering system may collect network service usage information via an add usage interface and store the usage information in a database. In one embodiment, the usage information may be partitioned into two or more partitions. Once the usage information has been aggregated and stored, the metering system may be queried to obtain usage statistics such as aggregate usage over specific time intervals. In one embodiment, a pipeline mechanism that generates and processes batches of usage information may be implemented for adding usage information to the database. The pipeline mechanism may help to reduce or eliminate redundancy and loss of usage information, and may make the metering system linearly scalable in multiple dimensions.

23 Claims, 9 Drawing Sheets

METHOD AND APPARATUS FOR NETWORK SERVICES METERING

This application is a continuation of U.S. application Ser. No. 11/396,402, filed Mar. 31, 2006, incorporated by reference herein in its entirety.

BACKGROUND OF THE INVENTION

1. Field of the Invention

This invention relates to computer systems and networks, and, more particularly, to metering usage of network services, such as Web services.

2. Description of the Related Art

A service provider may make a network service available for use by third parties. For example, the field of utility computing involves a service provisioning model in which a service provider makes computing resources and infrastructure management available to the customer as needed, and charges them for specific usage rather than a flat rate. However, efficiently metering usage of network services can be problematic, especially for large scale and/or heavily used network services.

The conventional Web model allows users to access Web resources (e.g., applications, services, and data) via an HTTP client program, such as a Web browser. A technology referred to as Web services has been developed to provide programmatic access to Web resources. Web services may be used to provide Web software developers programmatic access to Web resources including technology platforms (e.g., applications and services) and data (e.g., product catalogs and other databases) hosted on Web-connected computers such as Web server systems via a Web service interface. Generally speaking, a Web service interface may be configured to provide a standard, cross-platform API (Application Programming Interface) for communication between a client requesting some service to be performed and the service provider. In some embodiments, a Web service interface may be configured to support the exchange of documents or messages including information describing the service request and response to that request. Such documents, or messages, may be exchanged using standardized Web protocols, such as the Hypertext Transfer Protocol (HTTP), for example, and may be formatted in a platform-independent data format, such as eXtensible Markup Language (XML), for example.

Web Services Description Language (WSDL) is an XML format for describing network services as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services). WSDL is extensible to allow description of endpoints and their messages regardless of what message formats or network protocols are used to communicate.

SUMMARY

Various embodiments of a method and apparatus for metering network services, for example Web services, are described. In embodiments, a network services metering system may collect usage information from network service requests via an add usage interface, and may provide a get usage interface for querying the metering system to obtain usage statistics from the collected usage information. In one embodiment, the metering system may be integrated as a component of a Web services framework implemented by a Web services provider to expose one or more Web services to clients. Embodiments of the metering system may be used to aggregate and store usage information for Web services within the Web services framework. Once the usage information has been aggregated and stored, the metering system may be queried to obtain usage statistics such as aggregate usage over specific time intervals. For example, a Web services framework may use the metering system to track usage totals for bandwidth, storage space, and requests for one or more Web services over specified time intervals. The usage statistics may be used for any of a variety of purposes, for example billing, throttling or reporting.

In one embodiment, a pipeline mechanism may be implemented for adding usage information to a usage database. In one embodiment, usage information collected by an interceptor process running on each Web services frontend server may be added to the metering system via an add usage interface to a metering service component. Instances of the metering service component may unpack usage data received from the interceptors and collect the usage data into one or more usage batches. A metering service instance receives usage records one at time and serialized the records into strings, and appends them to one of one or more in-memory usage batches. A metering service instance collects a usage batch in memory until the batch gets to a certain size, or to a certain staleness. Once a usage batch is ready, the metering service instance feeds the batch into the queues of an appropriate pipeline of a partition. In one embodiment, each usage batch may include a batch identifier (ID) that uniquely identifies the batch. Usage batches may be fed into the queues by the metering service instances, and read from the queues and processed by aggregator processes in each queues' pipeline. Each aggregator may aggregate usage information from the batches in memory, and may periodically or aperiodically write the usage information to the usage database in the pipeline in a transactional operation. Once the in-memory usage information has been successfully committed to the usage database in the pipeline, the aggregator may flush its memory, and dequeue the completed batches from the queue(s).

The aggregators may be viewed as fault-tolerant "middlemen" between the incoming and queued usage information and the store. In one embodiment, after and only after a batch is committed to the store, the batch may be dequeued from the queue and disposed of by the aggregator. Note that each partition may include one or more pipelines, with each pipeline including at least one queue, aggregator, and database instance. These and other aspects of the metering system architecture may help to reduce or eliminate redundancy and loss of usage information, and that also may make the metering system linearly scalable in multiple dimensions.

Usage information may be stored in one or more databases stored on one or more data storage devices and/or data storage systems. In one embodiment, the usage information may be partitioned into two or more partitions by the metering system. Each partition may include one or more systems or servers that each implement one or more instances of components of the metering system that support that particular partition. Note that, in one embodiment, the servers, partitions, and/or data storage devices or systems may be distributed across two or more data centers.

An entity (e.g., a billing service) may query the metering system for usage statistics via a get usage interface provided by the metering service. In one embodiment, the query may identify the usage statistics to be retrieved, the time period for which the statistics are to be retrieved, and the number of statistics to be returned. A metering service instance may receive the query and fetch usage records that satisfy the query from one or more database instances in the usage database. The metering service may merge or otherwise process the query results, as necessary or desired, to generate usage statistics. The usage statistics may then be returned to the querying entity.

While embodiments of the network services metering system are generally described herein in the context of metering Web services, embodiments may be used for metering usage of other types of network services, network applications, programs, systems, etc.

Figure 1:
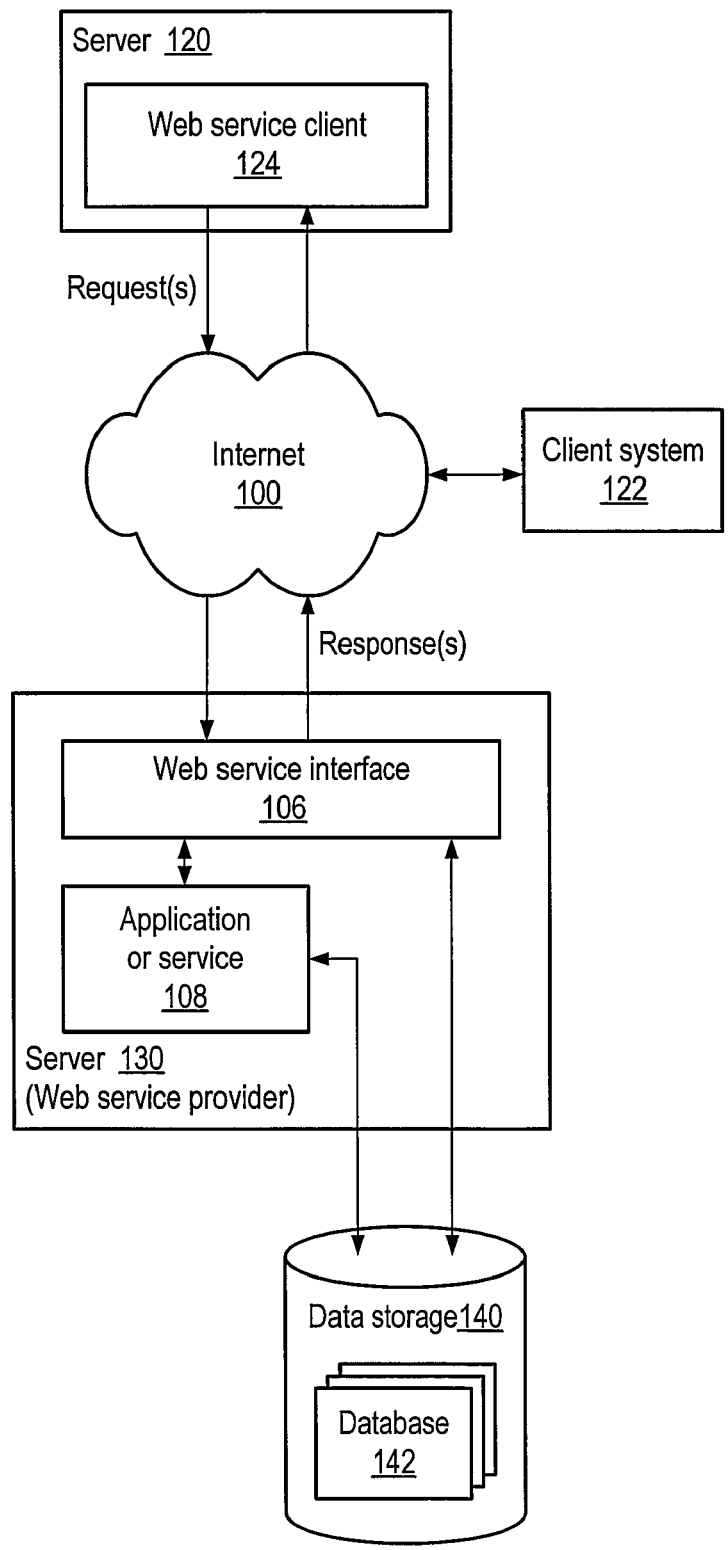
FIG. 1 is a block diagram that illustrates an exemplary system configuration that provides a Web service interface, and shows the interaction between a Web service client and a Web service provider.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for metering network services, for example Web services, are described. In embodiments, a network services metering system may collect usage information from network service requests via an add usage interface, and may provide a get usage interface for querying the metering system to obtain usage statistics from the collected usage information. The usage statistics may be used, for example, for determining network service usage, for charging network service customers (billing), and for analyzing network service usage data. Note that, while embodiments of the network services metering system are generally described herein in the context of metering Web services, embodiments may be used for metering usage of other types of network services, network applications, programs, systems, etc.

In one embodiment, the metering system may be integrated as a component of a Web services framework, e.g. a Web services framework implemented by a Web services provider to expose one or more Web services to clients. Embodiments of the metering system may be configured to store, aggregate, and retrieve Web service usage information for various processes of the Web services framework and/or for the Web services themselves. For example, the metering system may be used to collect Web service usage information and to provide usage statistics from the collected usage information to Web Services billing, throttling, and reporting processes.

Embodiments of the metering system may be used to aggregate and store usage information for Web services within the Web services framework. Once the usage information has been stored, the metering system may be queried to obtain usage statistics such as aggregate usage over specific time intervals. For example, a Web services framework may use the metering system to track usage totals for bandwidth, storage space, and requests for one or more Web services over specified time intervals. The usage statistics may be used for any of a variety of purposes, for example billing, throttling or reporting.

FIG. 1 is a block diagram that illustrates an exemplary system configuration that provides a Web service interface, and shows the interaction between a Web service client and a Web service provider. In this example, a Web service interface 106 may be implemented on a server 130 coupled to Internet 100. This server 130 may be referred to as a "Web service provider". Server 130, or alternatively one or more other servers coupled to server 130, may include one or more applications or services 108. Server 130 may be coupled to data storage 140 for storing information in database 142. Database 142 may include any type of data.

Server 120 may be coupled to Internet 100. Server 120 may host a Web service client 124. Web service client 124 may be configured to programmatically access application or service 108 of server 130 and/or database 142 via Web service interface 106. Note that Web service interface does not provide a "Web browser" interface, but instead provides a programmatic interface via an API through which at least some functionality of application or service 108 and/or at least some data in database 142 may be programmatically accessed by Web service client 124. Also note that server 120 may provide a Web site accessible to client(s) 122 via Web browsers, and Web service client 124 may be configured to access at least some functionality of application or service 108 and/or at least some data in database 142 of server 130 via Web service interface 106 to provide access to at least some functionality of application or service 108 and/or at least some data in database 142 via the Web site provided by server 120. Further, note that Web service client 124 may itself be another Web service.

To access an application, service or data provided by the Web service provider 130, Web service client 124 may send a request message to Web service interface 106 via Internet 100. This request message goes through the network and Internet infrastructures, through the Web service client 124's local network routers, switches, firewalls, etc., through the Internet backbone, to the Web service provider's local network, to Server 130, and then to Web service interface 106. Web service provider 130 may then process the request, for example by performing an indicated function(s) of application or service 108 or accessing indicated data in database 142. Note that application or service 108 may access data storage 140, for example to access database 142, in the process of performing an indicated function. Web service interface 106 may then return results of the processing to the Web service client 124 in a response message via Internet 100, back through the local networks and Internet backbone.

Figure 2:
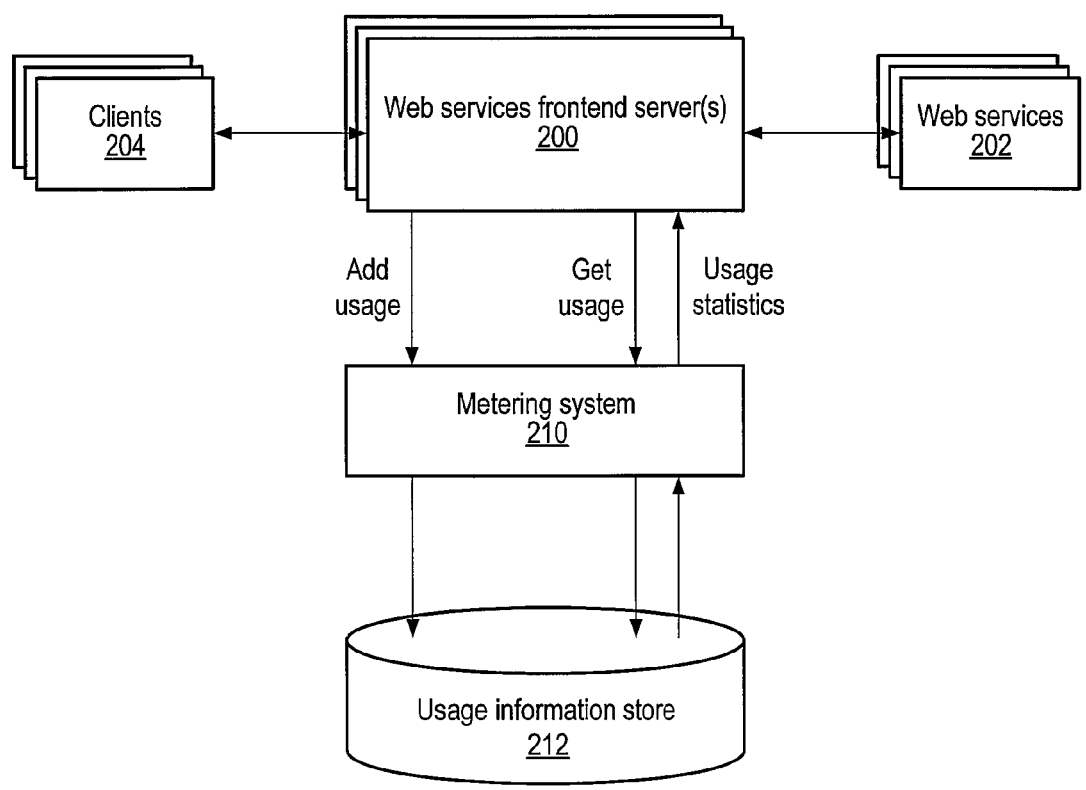
FIG. 2 illustrates a high-level architecture of a metering system in a Web services framework, according to one embodiment.

FIG. 2 illustrates a high-level architecture of a metering system in a Web services framework, according to one embodiment. One or more Web services frontend servers 200 may serve as a frontend to one or more Web services 202 for various clients 204. Note that, while Web services 202 are shown outside Web services frontend servers 200 in FIG. 2, one or more of Web services 202 may be implemented on one or more of the Web services frontend servers 200. Metering mechanism 210 may collect usage information for client 204 usage of one or more Web services 202 via an add usage interface, and may provide usage statistics to one or more Web Services billing, throttling, reporting, or other processes or services, or in some embodiments to other entities, via a get usage interface.

In one embodiment, components of metering system 210 may be implemented on one or more backend servers in the context of the Web services framework. Note, however, that one or more components of metering system 210 may be implemented on one or more of the Web services frontend servers 200. However, one or more backend servers (in the context of the Web services framework) that each implement one or more instances of one or more components of the metering service may be considered frontend servers of the metering system itself, while one or more instances of one or more other components of the metering system 210 may be implemented on backend servers in the context of the metering system 210. Embodiments of this architecture are further described in reference to the Figures below.

Usage information store 212 may be implemented as one or more databases stored on one or more data storage devices and/or data storage systems. In one embodiment, usage information may be partitioned into two or more partitions by the metering system 210. Each partition may include one or more systems or servers that each implement one or more instances of components of the metering system that support that particular partition. Note that, in one embodiment, the servers, partitions, and/or data storage devices or systems may be distributed across two or more data centers.

In one embodiment, metering system 210 may provide an add usage operation via an add usage interface to add Web services usage information to usage information store 212, and a get usage operation via a get usage interface, or query interface, to get Web services usage information from usage information store 212. In one embodiment, the metering system interface may be exposed to, and used by, one or more components or processes of the Web services framework, such as a billing service. In one embodiment, the metering system interface may be externally exposed to clients 204 of the Web services framework 200.

In one embodiment, the metering system may be exposed as a Web service via a Web Service interface. In this embodiment, the metering system 210 may be exposed via the Web service interface as a Web service that other entities may leverage to perform metering of services, applications, etc. An entity may implement functionality that intercepts calls to a service or other application that is being metered. The entity may then make calls through the Web service interface to the metering system 210 to add usage information to and get usage statistics from a usage information store 212 for the metered service.

Embodiments of the metering system 210 as described herein may be implemented according to an architecture that is linearly scalable. Embodiments may be scaled quickly and easily with little or no risk of losing usage information, with minimum or no downtime, and without affecting the latency of the overall system. Partitioning the usage information store 212 may help to make the metering system scalable. New partitions may be added to support increased volume and for load-balancing. Frontend servers 200 may be added as needed to send usage information into the metering system 210.

Embodiments of the metering system 210 may be implemented according to an architecture that achieves a desired level of latency from the view of clients of the metering system. Components of the metering system may be added as needed, as described above, to help maintain the desired level of latency. Note that the metering system 210 is linearly scalable, and so may be scaled upwards without negatively affecting the latency of the overall system.

Embodiments of the metering system 210 may be implemented according to an architecture that tends to reduce or eliminate redundancy in stored usage information, while also reducing or eliminating the potential loss of usage information. In one embodiment, a pipeline mechanism may be implemented for adding usage information to the store 212 in which usage information is queued in usage batches (which may also be referred to herein as batches) in one or more queues by one or more instances of a metering service component. Each queue may be viewed as the head of a pipeline. In one embodiment, each instance of a metering service may run on a separate server. In one embodiment, two or more instances of a metering service may run on each server. A task of the instances of the metering service component is to unpack usage data received from the Web services frontend servers 200 and to collect the usage data in strings or batches. A usage batch may be viewed as a serialized list of usage records. A metering service instance receives usage records one at time in some format and serialized the records into strings, and appends them to an in-memory batch. A metering service instance collects a usage batch in memory until the usage batch gets to a certain size (i.e., reaches some predetermined size threshold), or to a certain staleness (i.e., the oldest entry is older than some predetermined period, e.g. one minute). Once a usage batch is ready, the metering service instance feeds the batch into the queues of an appropriate pipeline.

In one embodiment, each usage batch may include a batch ID that uniquely identifies the batch. In one embodiment, when the metering service 222 needs to start a new usage batch, it generates a batch ID for the batch. In one embodiment, the batch ID may include a random 64-bit number, a timestamp, and a process ID for a process. Thus, the batch ID may be unique for any given batch. Note that other embodiments may use other methods to generate unique batch IDs.

Usage batches may be fed into the queues by the metering service instances, and read from the queues and processed by aggregator processes in each queues' pipeline. Each aggregator may aggregate usage information from the batches in memory, and may periodically or aperiodically write the usage information to the store 212 in a transactional operation. In one embodiment, each instance of an aggregator process may run on a separate server. In one embodiment, two or more instances of an aggregator process may run on each server. In one embodiment, the batches may be committed to the store 212 transactionally. Once the in-memory usage information has been successfully committed to the database in the pipeline, the aggregator may flush its memory, and dequeue the completed batches from the queue(s).

The aggregators may be viewed as fault-tolerant "middlemen" between the incoming and queued usage information and the store 212. In one embodiment, after and only after a batch is committed to the store 212, the batch may be dequeued from the queue and disposed of by the associated aggregator. Note that each partition may include one or more pipelines, with each pipeline including at least one queue, aggregator, and database instance. These and other aspects of the metering system 210 architecture that, for example, may help to reduce or eliminate redundancy and loss of usage information, and that also may make the metering system linearly scalable in multiple dimensions are further described below in reference to FIG. 3 and other Figures.

Add Usage Operations

Figure 3:
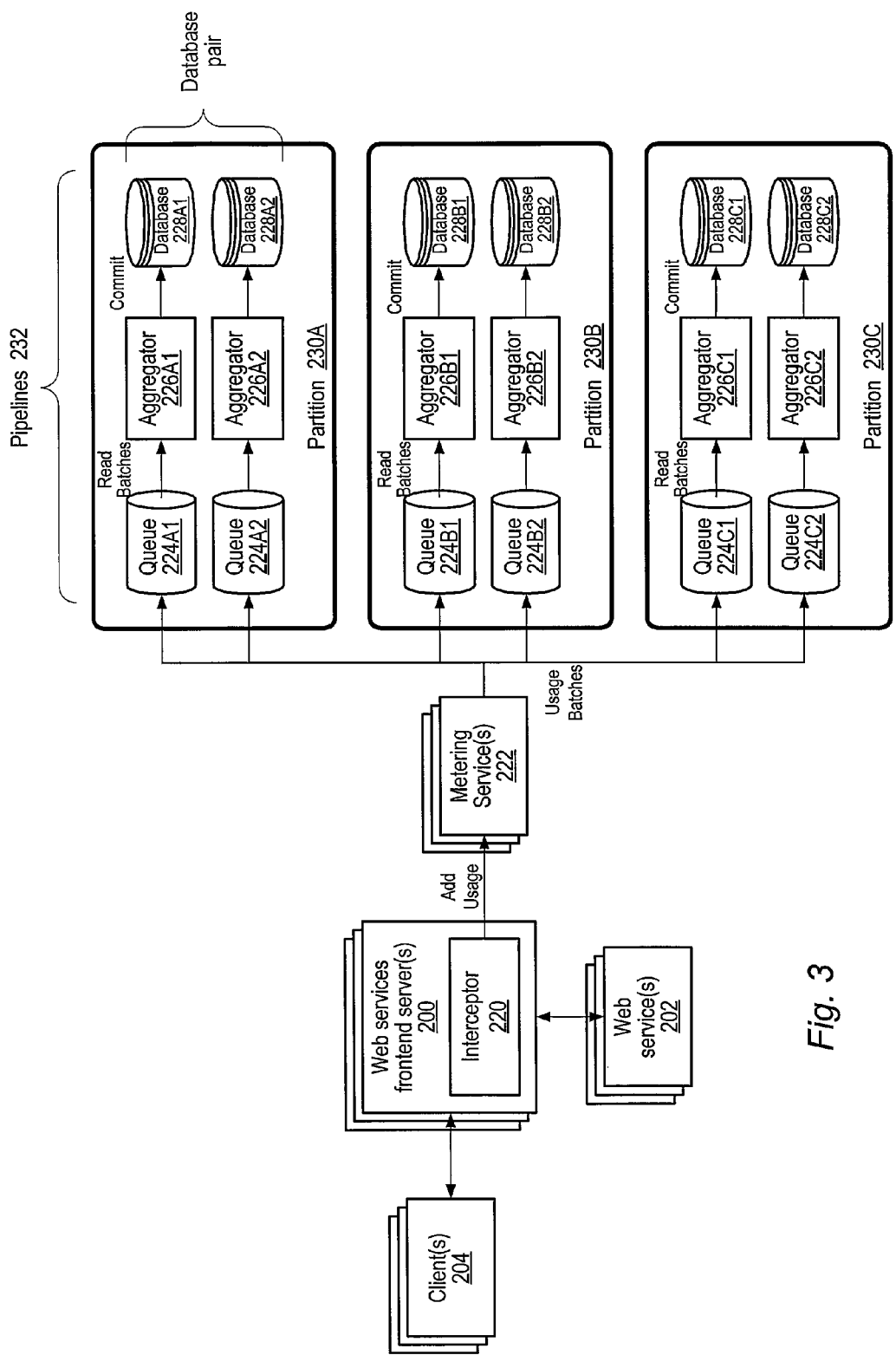
FIG. 3 illustrates the architecture and data flow of a metering system as related to the add usage operation, according to one embodiment.

FIG. 3 illustrates the architecture of and data flow in a metering system as related to the add usage operation, according to one embodiment. In one embodiment, the metering system may include, but is not limited to, the following components:

- A metering interceptor 220, an instance of which may reside on each Web services frontend server 200, and which may execute within a request processing pipeline of the server 200. In one embodiment, the interceptor may execute in parallel with Web server software in a separate thread. The operation of the interceptor may thus be transparent to users and other processes.
- One or more instances of a metering service 222. In one embodiment, the instances of metering service 222 may be implemented as services running behind a virtual IP address (VIP).
- One or more instances of a metering queue 224. In one embodiment, metering queue 224 may be implemented as a service internal to an entity implementing the metering system. In other embodiments, metering queue 224 may be an HTTP service.
- One or more instances of a metering aggregator 226. In one embodiment, a metering aggregator may be implemented as a Linux process. In one embodiment, metering aggregator 226 may be implemented as a client process to metering service 222.
- One or more instances of a usage database 228. In one embodiment, a usage database 228 may be implemented as a MySQL instance. Other embodiments may use other types of databases.

In one embodiment, there may be one interceptor 220 per Web services frontend server 200. In one embodiment, the metering service 222 instances may be organized into a single pool, which may be shared by all instances of interceptor 220. In one embodiment, the metering service 222 instances may reside behind a virtual IP address (VIP). Thus, in this embodiment, there may be a single server that acts as a load balancer to two or more servers each including at least one instance of metering service 222. Note that, in one embodiment, each metering service 222 instance may be functionally identical, and thus an incoming add usage or get usage requests may go to any instance of the metering service 222.

Pipeline Processing of Batches

The remaining components may be organized into one or more metering pipelines 232. In one embodiment, each pipeline 232 may include a single queue 224 instance that feeds batches of usage information received from metering service 222 instances to an aggregator 226 instance that aggregates the usage information and writes the usage information into a database 228 instance. In one embodiment, metering pipelines 232 may be paired into one or more partitions 230. In this embodiment, each metering service 222 instance may feed usage information into both pipelines 232 in a single partition 230.

In one embodiment, each database 228 instance may be owned by a single partition 230. In another embodiment, a database 228 instance may be shared by two or more partitions 230. In one embodiment, database 228 instances may be paired such that, for each partition 230 that writes to the pair of database 228 instances, one pipeline 232 writes to one instance of the database 228 and the other writes to the other instance of the database 228. This ensures that the two instances of the database 228 in a pair receive the same usage information.

In FIG. 3, three exemplary partitions 230 and six exemplary database 228 instances are shown. In this exemplary embodiment, each partition 230 includes a pair of database 228 instances. Partition 230A includes database instances 228A1 and 228A2; partition 230B includes database instances 228B1 and 228B2; and partition 230C includes database instances 228C1 and 228C2. In another embodiment, instead of having two database 228 instances for each partition 230, there may be two database 228 instances that are shared among all partitions 230, with one pipeline 232 in each partition 230 feeding usage records into one of the database 228 instances, and the other pipeline 232 in each partition 230 feeding usage records into the other database 228 instance. Using FIG. 3 to illustrate this embodiment, database instances 228A1, 228B1, and 228C1 would refer to one database 228 instance, and database instances 228A2, 228B2, and 228C2 would refer to the other database 228 instance.

In one embodiment, queues 224 may be implemented as instances of a queue by a queue service that exposes a queue interface to the queues 224. In one embodiment, each queue 224 may be instantiated and maintained as a first in-first out (FIFO) queue. Each queue 224 may be persistent. The queue service may expose three interfaces: an enqueue interface via which the metering service 222 instances feed batches into one end of the queues 224, a read interface via which aggregators 226 read batches from the other end of the queues 224, and a dequeue interface via which aggregators 226 may dequeue batches from the end of the queues 224. Note that processing usage information in batches reduces the number of calls necessary to the queue service by both the metering service 222 instances and the aggregators 226.

The metering service 222 instances queue batches of usage information into queues 224 via the queue service interface. The batches may then be read and dequeued by the aggregator 226 instances via the queue service interface. The queue service and queue 224 instances may provide a high probability that, after a batch is dequeued, the batch will not be read again. However, as embodiments may be implemented as distributed systems, it is important to prevent batches from being read from the queues 224 and committed to the database 228 more than once. Thus, embodiments may provide one or more mechanisms to help insure that the same batch will not be read from a queue 224 and processed twice, which might, for example, result in a customer being charged twice for one request to a Web service. Further, embodiments may provide one or more mechanisms to detect duplicate usage records.

As previously mentioned, each batch may be assigned a unique batch ID by the metering service 222. In one embodiment, the batch ID may be stored to the database with the usage records. The batch ID may then be used to detect any duplicate usage records to prevent duplicate usage records from being written to the database 228. In one embodiment, an aggregator 226 instance reads a batch of usage records from a queue 222 instance. Before committing the batch to the database, the aggregator may then query the database 228 to determine if the batch ID of the batch has already been written to the database 228. If the batch ID is already in the database 228, the aggregator 226 instance knows that the batch has already been committed to the database 228, and thus does not commit the batch to the database 228. The aggregator 226 instance may then dequeue the batch from the queue 222 instance, and may also flush the batch from memory if the batch has already been stored in memory.

In one embodiment, each partition 230 may include two queues 224, one for each pipeline 232. In one embodiment, the two queues 224 of a partition 230 may be implemented in different data centers. Each metering service 222 instance is constantly generating a batch for each partition 230. Once a batch for a partition 230 is ready to be enqueued, the metering service 222 instance simultaneously enqueues the batch to both queues 224 of the partition 230. If either enqueue 224 fails, the metering service 222 retries the enqueue. Having two queues 224 for each partition 230 provides redundancy. If either one of the queues 224 fails for some reason, e.g. if the data center in which the queue 224 is implemented goes down, there is still a complete pipeline 232 via which batches can be fed into the database 228.

In one embodiment, each queue 224 may not necessarily be equivalent with a physical instance of a system in a particular data center. Instead, the queues 224 may be considered logical queues, and may be instantiated anywhere the queue service decides to instantiate them. Note that the metering system is not concerned as to where the queues 224 are instantiated, as long as the queue service guarantees redundancy. If a metering service 222 instance is brought down for any reason, the metering service 222 instance may flush all current batches in memory to the queues 224 before shutting down. This may help to reduce or prevent the loss of usage information.

Once a batch is enqueued to the queues 224 for a partition 230, the metering service 222 is done with the batch. Once the batch is enqueued to the queues 224, the queue service persists the batch in the queues 224 until the batch is dequeued.

An aggregator 226 may read batches off the queue 224 in its pipeline 232 in sets of one or more batches. For example, an aggregator 226 may read ten batches from a queue 224 at one time. In one embodiment, once an aggregator 226 has read a batch from a queue 224, the aggregator 226 may read the batch ID from the batch, and then may query the database 228 to find out if the batch ID is already in the database. If the batch ID is already in the database 228, the aggregator 226 may dequeue the batch from queue 224 and dispose of the read batch without further processing. If the batch ID is not in the database 228, the aggregator 226 may check (e.g., using the batch ID) to see if the usage information in the batch has already been aggregated into its memory. If the usage information in the batch is already aggregated in memory, then the aggregator may dispose of the read batch. Note that the batch is not dequeued in this case because it has not yet been committed to the database 228.

Thus, throughout a pipeline 232, the unit of processing is a batch. The metering service 222 generates batches and enqueues them to queues 224. The aggregators 226 read batches from the queues 224. If the batch is already in the database 228, the aggregator 226 dequeues the batch and disposes of it. If the batch is not in the database 228 but is in the aggregator 226 memory, the aggregator 226 ignores the batch but does not dequeue the batch. The batch is not dequeued by the aggregator until the batch is committed to the database 228 in a transaction, and the transaction is verified to have completed successfully. This pipeline processing of batches helps to protect against losing usage information and against duplicating usage information in the database 228. If a batch was dequeued before committing the usage information to the database, the usage information in the batch may be lost, for example if a system fails.

It is possible that some event or failure may occur that causes a batch to be committed to a database 228 but not dequeued from the queue 224. This does not cause duplication of data because the aggregator 226 may later read the batch from the queue 224 and check to see if the batch is already in the database 228. Upon discovering that the batch has already been committed to the database 228, the aggregator 226 dequeues and disposes the batch. This protects against duplication of usage information in the database 228, while not dequeuing a batch until committed to the database 228 protects against losing usage information.

In one embodiment, an aggregator 226 may perform time aggregation of usage information for at least some usage metrics. For example, for some usage metrics, it may not be necessary or desired to maintain the usage metric at a fine-grained time level, e.g. at the nearest second, minute, or hour. Instead, the usage information may be aggregated over larger intervals, e.g. an hour or a day, to produce an aggregate usage record for the metric. All usage information received by the aggregator 226 that falls within the desired interval, using the timestamp as the key, may be aggregated (added up) into one usage record.

To help reduce the risk of losing usage information, a time and/or size limit may be set for batches. Batches may be limited to, for example, ten seconds of data (and thus may be considered "stale" by the metering service 222 after ten seconds), and/or a certain number of entries (e.g., ten) may be set as the size limit for batches, wherein a batch with at least ten entries is considered full.

As another mechanism to help reduce the risk of losing usage information, embodiments may employ multiple servers each running an instance of metering service 222. As mentioned, the metering service 222 instances may run behind a VIP that serves as a load balancer to the metering service 222 instances. Thus, over a time period for which batches are limited (e.g., ten seconds) each metering service 222 instance may receive a fraction of the usage information for that time period. If one of the servers hosting an instance of metering service 222 fails, only that fraction of the usage information for the time period is at risk of being lost. For example, if there are 18 servers each hosting an instance of metering service 222, and one of the servers fails, only ⅛th of ten seconds of usage information is at risk of being lost.

Add Usage API

In one embodiment, the metering service 222 may provide an interface, or API, to add usage to the usage database 228. The add usage method may be invoked via this interface to inform the metering service of new usage. In one embodiment, the interceptor 220 instances on the Web services frontend servers 200 call the add usage method to add usage to the usage database 228. The following describes parameters that may be passed to an exemplary add usage method via the add usage interface, and is not intended to be limiting:

| Parameter | Type | Description |
| --- | --- | --- |
| Subscriber ID | string | The identifier of the entity to which this usage is attributed. |
| UsageType | string | The type of usage (e.g., Requests, Bandwidth, Storage, etc.). |
| Service | string | The Web service invoked by the request that generated the usage. |
| Operation | string | The Web services operation invoked by the request that generated the usage. |
| Value | double | The incremental usage value. |
| Timestamp | datetime | The time at which the usage occurred. |

Usage Records

In one embodiment, usage may be tracked in usage records, each of which may represent a single activity. As usage data flows through the metering system, fields may be added by different components of the mechanism. The following describes fields of an exemplary usage record, and is not intended to be limiting. Note that "Request object" as used herein may refer to any object, data structure, or message that includes request information and that is maintained and used by the Web services framework to broker requests between clients 204 and Web services 202.

| Field | Description | Examples | Added By |
| --- | --- | --- | --- |
| UsageType | The type of usage described by this record. | "Requests" "Bandwidth In" | Interceptor (from Request object) |
| Service | The Web service invoked by the request that generated the usage. | "E-Commerce" "Query Service" | Interceptor (from Request object) |
| Operation | The Web services operation invoked by the request that generated the usage. | "ItemQuery" "WebCrawl" | Interceptor (from Request object) |
| SubscriberID | The identifier of the entity that invoked the request that generated the usage. | | Interceptor (from Request object) |
| Quantity (or Value) | The amount of usage incurred. | 18.34 | Interceptor (from Request object) |
| UsageTime | The time the usage occurred. | 2005-05-07T10:23:18Z | Metering service |

In one embodiment, metering service 222 instances may collect usage records received from interceptors 220 into usage batches. In one embodiment, a usage batch may be an array of one or more usage records, prefixed by a unique batch ID. In one embodiment, the usage records may be ordered in the array in accordance with usage time. Note that the metering service 222 instances may timestamp the usage records.

Add Usage Data Flow

Figure 4:
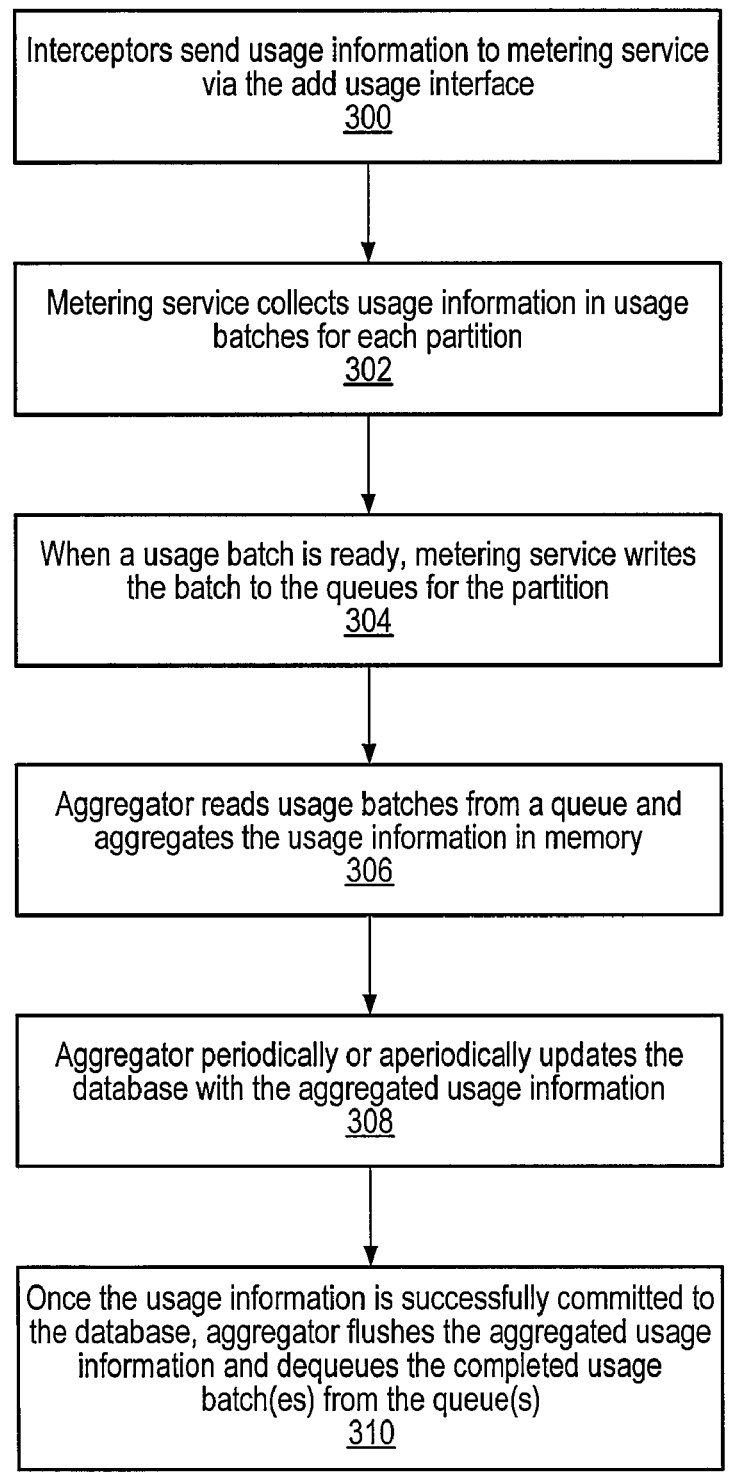
FIG. 4 illustrates the high-level flow of usage information through the metering system in add usage operations, according to one embodiment.

FIG. 4 illustrates the high-level flow of usage information through the metering system in add usage operations, according to one embodiment. As indicated at 300, interceptors 220 running as processes within the Web services frontend servers 200 intercept Web service usage and send the usage information to the metering service 222 via the add usage interface. The metering service collects the usage information in usage batches for each partition 230, as indicated at 302. As indicated at 304, when a usage batch for a partition 230 is ready, the metering service 222 writes the usage batch to the queues 234 for the partition 230. In one embodiment, the metering service 222 may write a usage batch to the queues 224 for the partition 230 when the batch is full (i.e., when a certain number of usage entries have been added to the batch). In one embodiment, the metering service 222 may write a usage batch to the queues 224 for the partition 230 when the batch is sufficiently stale (i.e., when a time limit for keeping a current batch has been reached or exceeded).

As indicated at 306, an aggregator 226 of a partition 230 reads usage batches from a queue and aggregates the usage information in memory. The aggregator 226 periodically or aperiodically updates the database 228 with the aggregated usage information, as indicated at 308. In one embodiment, the update of the database may be performed via one transaction.

Each usage batch may be assigned a unique batch ID by the metering service 222. In one embodiment, the batch ID may be stored to the database 228 with the usage records. The batch ID may then be used to detect any duplicate usage records to prevent duplicate usage records from being written to the database 228. In one embodiment, before committing a batch to the database 228, the aggregator 226 may query the database 228 to determine if the batch ID of the batch has already been written to the database 228. If the batch ID is already in the database 228, the aggregator 226 instance knows that the batch has already been committed to the database 228, and thus does not commit the batch to the database 228. The aggregator 226 instance may then dequeue the batch from the queue 222 instance, and may also flush the batch from memory if the batch has been stored in memory.

Once the aggregated usage information has been successfully committed to the database 228, the aggregator 226 flushes the aggregated usage information from memory and dequeues the completed usage batch(es) from the queue(s) 224, as indicated at 310. Note that the flushing of the aggregated information and the dequeuing of the batches from the queue 226 are not performed until the transaction committing the usage information to the database 228 has successfully completed. This may help to prevent the potential loss of usage information if a portion of the pipeline 232 should fail.

Figure 5:
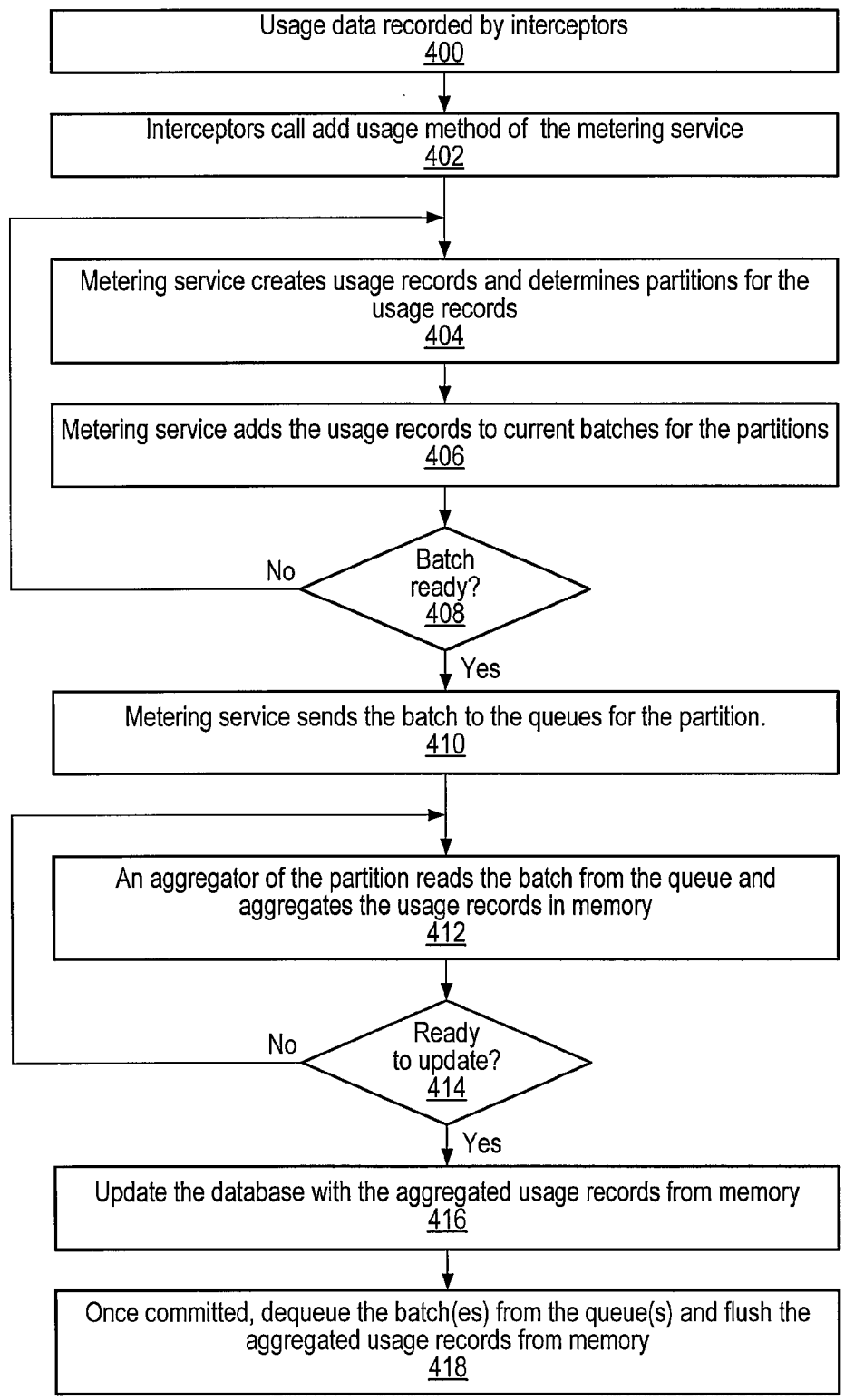
FIG. 5 illustrates the flow of usage information through the metering system in add usage operations in more detail, according to one embodiment.

FIG. 5 illustrates the flow of usage information through the metering system in add usage operations in more detail, according to one embodiment. As indicated at 400, usage data is recorded in a Request object by the Web services framework and by the on-line service code (e.g., Perl code) on a per-request basis. As indicated at 402, the metering interceptor 220 calls the metering service 222 add usage interface for each request, passing the usage incurred by the request.

As indicated at 404, the metering service 222 receives the usage passed by the metering interceptor 220, creates a usage record to represent it, and timestamps the usage record. The timestamp is assigned by the metering service 222 so that requests in a batch are guaranteed to be time-ordered, and to avoid discrepancies in time configuration on the Web services frontend servers 200. The metering service 222 assigns the usage to a partition 230, and adds the usage record to a current usage batch for that partition 230 as indicated at 406. At 408, when a current usage batch is full or is sufficiently stale, the metering service 222 sends the batch simultaneously (in one request) to both queues 224 for the assigned partition 230, as indicated at 410. Otherwise, the metering service may continue to receive usage from one or more of the interceptors 220. Note that the metering service 222 assigns a unique batch ID to each usage batch it generates, so that each usage batch sent to a queue 224 includes a batch ID that uniquely identifies the batch.

As indicated at 412, on both pipelines 232 for that partition 230, one of the metering aggregators 226 reads the batch from a queue 224. After checking in memory and in the database 228 to ensure that the batch has not been recorded already, the aggregator 226 accumulates the data in memory, aggregated by usage type, service, operation, and subscriber. The aggregator 226 also records the batch ID in memory. At 414, each metering aggregator 226 may periodically or aperiodically update its pipeline's database 228 by adding all of the usage information it has aggregated in memory, as indicated at 416. The metering aggregator 226 also records the batch IDs of the batches represented by the usage into the database 228. In one embodiment, this may all be performed as a single database transaction.

As noted, each usage batch may be assigned a unique batch ID by the metering service 222. In one embodiment, the batch ID may be stored to the database 228 with the usage records. The batch ID may then be used to detect any duplicate usage records to prevent duplicate usage records from being written to the database 228. In one embodiment, before committing a batch to the database 228, the aggregator 226 may query the database 228 to determine if the batch ID of the batch has already been written to the database 228. If the batch ID is already in the database 228, the aggregator 226 instance knows that the batch has already been committed to the database 228, and thus does not commit the batch to the database 228. The aggregator 226 instance may then dequeue the batch from the queue 222 instance, and may also flush the batch from memory if the batch has been stored in memory.

As indicated at 418, once the transaction has committed to the database 228, the batches are dequeued (removed) from the queue 224 and the aggregator 226 flushes the usage it has aggregated in memory. In one embodiment, the dequeuing and flushing are only performed once the aggregator 226 has verified that the usage records have been committed to the database. This helps to ensure that usage data are not lost.

Database Schema

Figure 6:
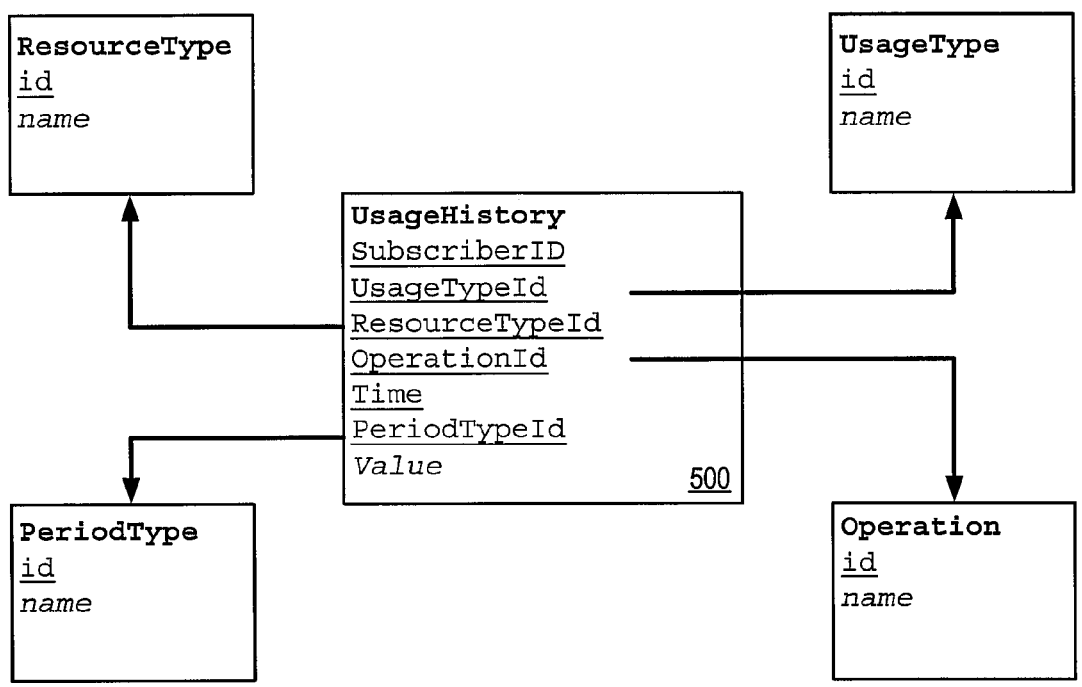
FIG. 6 illustrates an exemplary usage database schema according to one embodiment.

FIG. 6 illustrates an exemplary usage database 228 schema according to one embodiment. In one embodiment, a usage database 228 may be implemented as a MySQL instance. Other embodiments may use other types of databases.

Usage records may be stored in a usage database 228 as UsageHistory 500 records when transactionally committed by an aggregator 226. SubscriberID is the identifier of the entity (e.g., a Web service subscriber) that invoked the request that generated the usage record. UsageTypeID is the identifier of the type of usage described by this record, for example bandwidth, storage, or requests. ResourceTypeID is the identifier of the Web service for which the usage was generated. OperationID is the identifier of the Web services operation invoked by the request that generated the usage. Time is the usage time for the usage record inserted by the metering service 222. PeriodTypeID is the identifier of the type of time period (e.g. T day, T hours, T minutes, etc). The period specifies the length of the time interval that statistic will be computed over. Value is the amount of usage incurred.

Partitioning

As previously mentioned, the metering service may be partitioned, with each partition including at least two databases, and with each partition including at least two pipelines. Incoming usage information, received from interceptors via the add usage interface, may be unpacked and serialized into batches. Each batch may be targeted at a particular partition 230.

The metering service 222 instances are aware of the partitioning configuration. Each metering service 222 instance may collect usage information in batches for any of the partitions 230, and may feed the batches into any of the partitions 230. Thus, embodiments may provide a mechanism for dividing the incoming usage records among the partitions 230, and the metering service 222 may use this mechanism when serializing incoming usage information into batches.

In one embodiment, the metering service 222 may use a subset of the string generated by serializing an incoming usage record as a partitioning key. The metering service may hash the key, and determine the modulus(P) of the hash to determine which partition 230 this particular usage information is to be fed into, and thus which batch to write the serialized usage record into, where P is the number of partitions 230. From that, each metering service 222 instance may be generating P batches in memory. Each batch is to be fed into a particular one of the P partitions when ready. Thus, the metering service 222 as a whole is generating P sets of batches in memory. In the example illustrated in FIG. 3, metering service 222 may be generating three sets of batches; batches that are to be fed into partition 230A, batches that are to be fed into partition 230B, and batches that are to be fed into partition 230C. Note that any one incoming usage record will be partitioned into one batch.

In one embodiment, the key that is used may be taken from the serialized fields:

SubscriberID-UsageType-Service-Operation-value from a received usage record. In one embodiment, the first three fields:

SubscriberID-UsageType-Service may be used as the key. Thus, all requests for a particular entity (subscriber) of a particular usage type to a particular service will be written to a particular partition. If a usage record is received where at least one of the fields used in the key is different, the record may go to a different partition 230.

Note that, when the get usage interface is invoked to query for usage statistics, the same key, received as part of the query, may be hashed and used to locate the partition(s) 230 that include the usage record(s) that satisfy the query.

Get Usage Operations

The above primarily describes adding usage information to the metering system. This section describes more fully the get usage operations and interface for retrieving usage statistics from the metering system.

Figure 7:
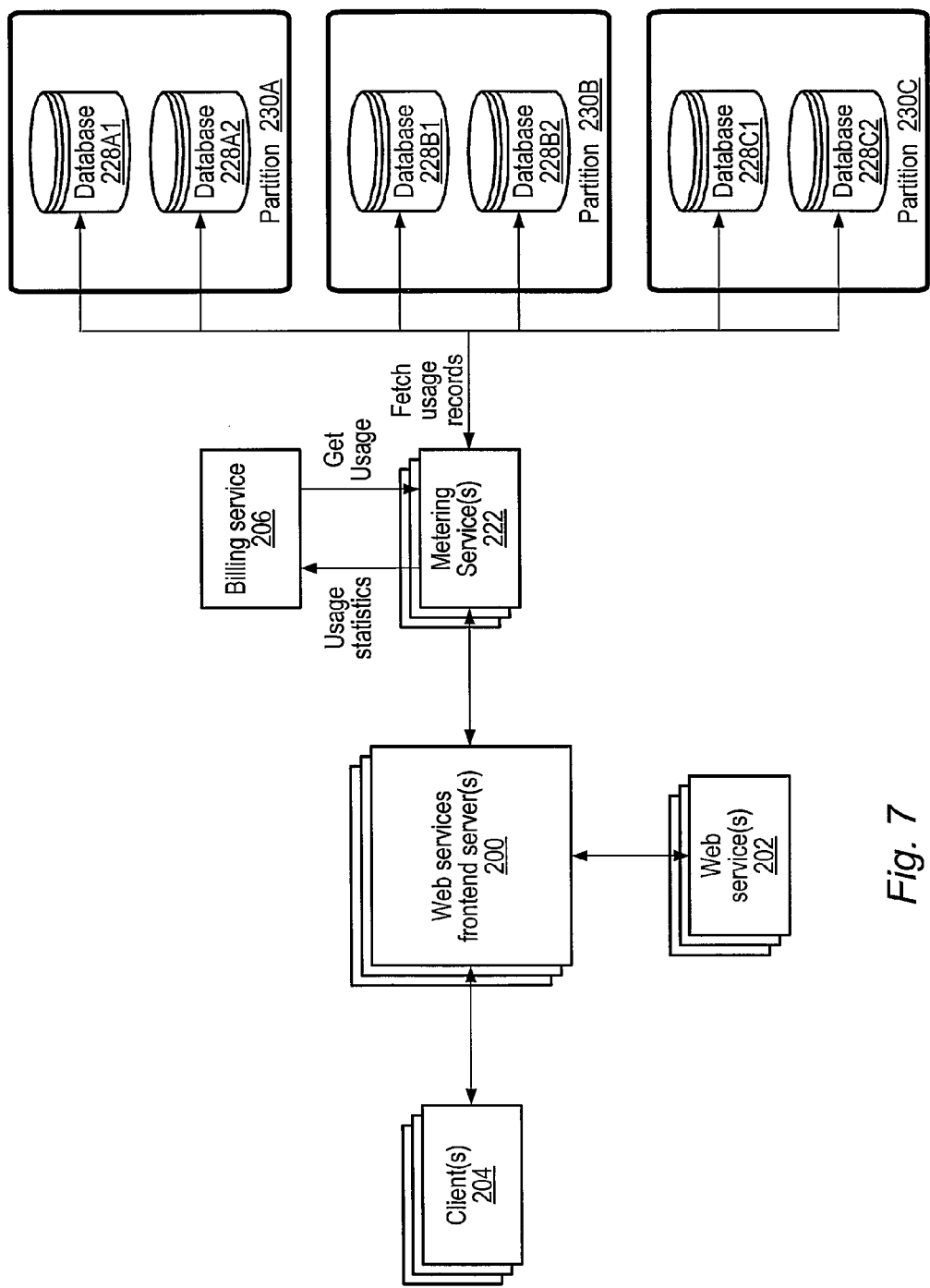
FIG. 7 illustrates the architecture and data flow of a metering system as related to the get usage operation, according to one embodiment.

FIG. 7 illustrates the architecture of and data flow in an exemplary metering system as related to the get usage operation, according to one embodiment. In this embodiment, usage information may be read from the databases 228 via a get usage interface provided by the metering service 222. The metering service 222 is responsible for fetching information (usage records) from all of the usage databases 228 and merging the results to satisfy calls, or queries, via the get usage interface.

In FIG. 7, a billing service 206 is provided as an example of a service, application, process, or other entity that may query the metering system for usage statistics via the get usage interface. Note that other types of services, applications or processes may query the metering system for usage statistics. Further note that, in FIG. 7, billing service 206 is shown as invoking the get usage interface of the metering service 222 directly. In one embodiment, a service, application or process may invoke the get usage interface of a metering service 222 via the Web service frontend server(s) 200.

Get Usage API

In one embodiment, the metering service 222 may provide an interface, or API, to get usage statistics from the usage database 228. The get usage method may be invoked via this interface to query the metering service for usage statistics. The following describes parameters that may be passed to an exemplary get usage method via the get usage interface, and is not intended to be limiting:

| Parameter | Type | Description |
| --- | --- | --- |
| inputStatistic | structure | A structure identifying the statistic to retrieve. |
| time | datetime | A time to be used as a base to compute the statistic. In one embodiment, this may be the start time. In one embodiment, this may be the end time. |
| howMany | integer | The number of statistic values to return. This, for example, may be useful for an application that wants the past 24 hours of fixed hourly statistics. |

Get Usage Data Flow

Figure 8:
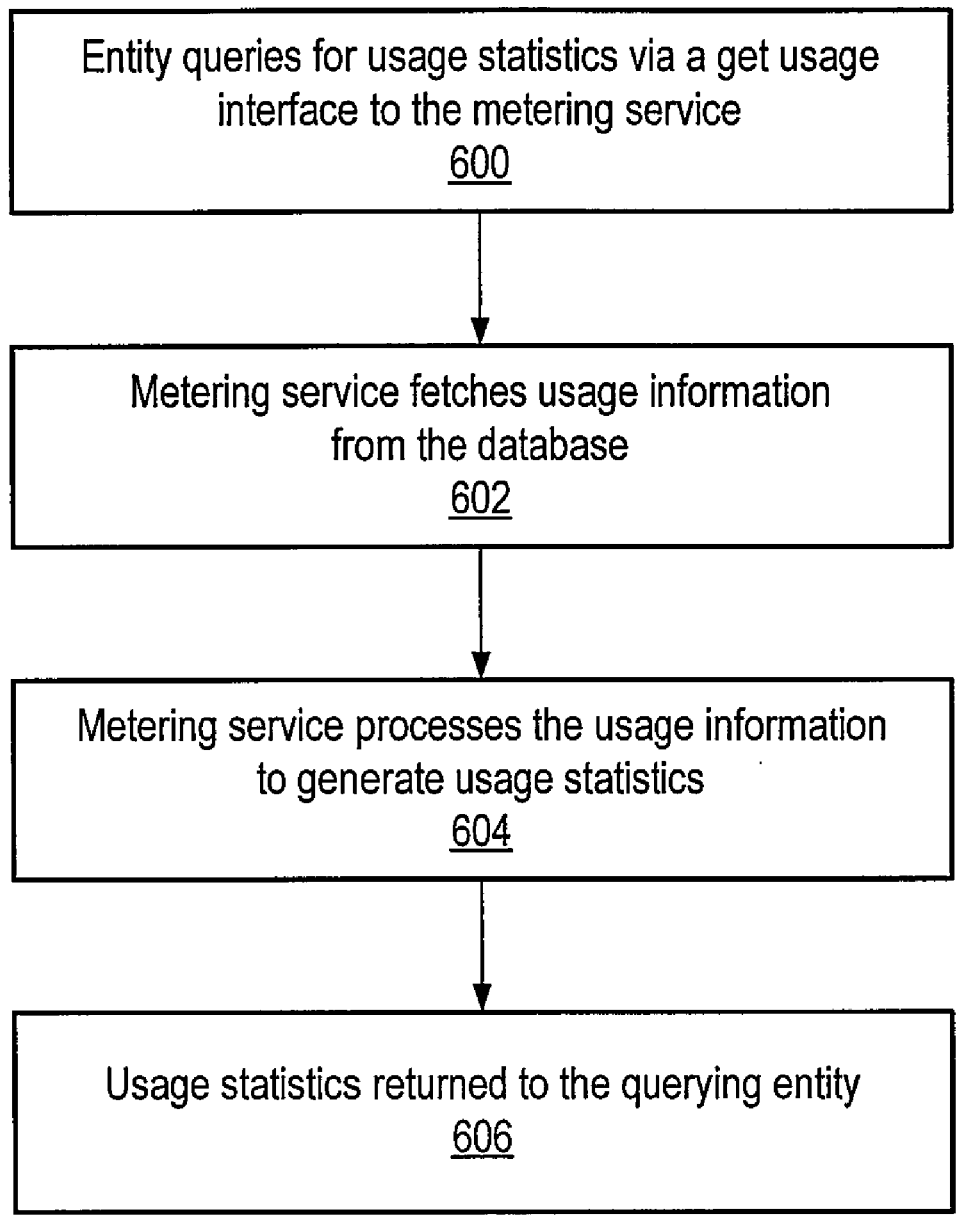
FIG. 8 illustrates the flow through the metering system in get usage operations, according to one embodiment.

FIG. 8 illustrates the flow through the metering system in get usage operations, according to one embodiment. As indicated at 600, an entity (e.g., billing service 206 of FIG. 7) may query the metering system for usage statistics via the get usage interface provided by the metering service 222. In one embodiment, the query may identify the usage statistics to be retrieved, the time period for which the statistics are to be retrieved, and the number of statistics to be returned. One or more of metering service 222 instances may receive the query. As indicated at 602, the metering service 222 may then fetch usage records from one or more of the usage databases 228 that satisfy the query, and may merge or otherwise process the results, as necessary or desired, to generate usage statistics, as indicated at 604. The usage statistics may then be returned to the querying entity, as indicated at 606.

Usage Statistics

The following are some definitions of terms that may be used in the discussion of usage statistics that may be requested via the get usage interface, computed by the metering system from the database 228 of usage records, and returned to the requesting entity. Note that these terms may also be used elsewhere in this document.

Usage type refers to a label identifying the kind of resource being consumed. Resources may include one or more of, but are not limited to, requests, bandwidth, and storage.

Usage record refers to a record representing the incremental usage of a usage type for a single web service request. Usage records are further described above in the section titled Add Usage Operations. The usage record may be identified with a particular subscriber via a subscriber ID in the record. Usage records may be generated and added to the database 228 by the add usage operations as described above.

A usage statistic refers to some statistical aggregation of usage records over some time period. In one embodiment, there may be two types of usage statistics: base statistics and derived statistics:

- A base statistic is the sum of usage records over a predefined minimum time interval. In one embodiment, the minimum time interval may be one minute. Other embodiments may use other minimum time intervals.
- A derived statistic is a statistic computed from base statistics over a longer time interval. In one embodiment, this may be a sum, or possibly a different mathematical computation than a sum.

Statistic Definition Structure

The following describes fields of an exemplary input statistic definition structure (e.g., inputStatistic in the above exemplary parameter list for a get usage method) that may be provided by an entity that is requesting a usage statistic via the get usage interface, and is not intended to be limiting.

| Field | Type | Description |
| --- | --- | --- |
| SubscriberID | string | The identifier of the entity to which this usage is attributed. In one embodiment, this may be a required field. |
| UsageType | string | The name of the usage type tracked with this usage statistic. (e.g., Requests, Bandwidth, Storage, etc.). In one embodiment, this may be a required field. |
| Service | string | The name of the Web service tracked with this statistic. In one embodiment, this may not be a required field. |
| Operation | string | The name of the operation tracked with this statistic. In one embodiment, this may not be a required field. |
| Period | [value, units] pair | The period specifies the length of the time interval that the statistic will be computed over. In one embodiment, the units may be one of "minutes", "hours", "days", or "months". Other embodiments may allow one or more other units, such as seconds, weeks, and years. In one embodiment, this may be a required field. |
| StatisticType | string | The type of statistic. In one embodiment, the type may be one of "rolling" or "fixed". (See below for further description). In one embodiment, this may be a required field. |
| AnniversaryTime | datetime | All time intervals (whose length is set by the period) for fixed statistics are calculated from the anniversary time. In one embodiment, this may be a required field for fixed statistics, but is not applicable for rolling statistics. |

In one embodiment, a rolling statistic may be computed over a sliding window of time, and thus may have a moving start time relative to the current time. For example, if at 12:00 the value of a rolling statistic with a period of 24 hours is requested, the usage accumulated from 12:00 the previous day (24 hours ago) will be computed and returned.

In one embodiment, a fixed statistic may be computed from a fixed start time relative to the current time. In one embodiment, the start time may be a multiple of the period past the anniversary time. For example, if at 15:00 the value of a fixed statistic with a period of 24 hours and an anniversary time of [2004-09-01 12:00:00] is requested, the usage accumulated since 12:00 the same day will be computed and returned.

In one embodiment, one or more of the "Service", "UsageType" and "Operation" fields of the input statistic definition structure may be unspecified by the calling entity (e.g., by inserting an "*" or other wildcard indicator in the field). In this embodiment, an output vector of one or more output statistics with all of these fields specified may be returned, providing output statistics for all combinations of the fields left unspecified in the input statistic definition structure that satisfy the specified fields in the structure.

In one embodiment, the get usage interface may accept arbitrary strings in one or more fields of the statistic definition structure, for example to specify the storage units (e.g., as bytes, megabytes, or gigabytes) or bandwidth units. This may allow the requestor to arbitrarily specify the way the usage statistics are collected, processed, and/or returned.

Usage Statistic Value Structure

The following describes fields of an exemplary usage statistic value structure, or record, that may be returned to an entity that requested a usage statistic via the get usage interface, and is not intended to be limiting.

| Field | Type | Description |
| --- | --- | --- |
| outputStatistic | structure | A structure that identifies this returned usage statistic. |
| value | double | The computed value for this usage statistic. Note that other types than double may be possible. |

Note that one or more usage statistic value structures may be returned to the requesting entity to satisfy one get usage request.

The following describes fields of an exemplary output statistic structure (e.g., OutputStatistic in the above exemplary usage statistic value structure) that may be returned to an entity that requested a usage statistic via the get usage interface as a field in a usage statistic value structure, and is not intended to be limiting.

| Field | Type | Description |
| --- | --- | --- |
| SubscriberID | string | The identifier of the entity to which this usage is attributed. |
| Time | datetime | A time that was used as a base to compute the statistic. In one embodiment, this may be the start time. |
| UsageType | string | The name of the usage type tracked with this statistic. (e.g., Requests, Bandwidth, Storage, etc.). |
| Service | string | The name of the Web service tracked with this statistic. |
| Period | [value, units] pair | The period specifies the length of the time interval that the statistic was computed over. In one embodiment, the units may be one of "minutes", "hours", "days", or "months". |
| Type | string | The type of statistic. In one embodiment, the type may be one of "rolling" or "fixed". |
| Operation | string | The name of the operation tracked with this statistic. |

Get Usage Example

The following is an example of a get usage operation using an exemplary get usage interface. In this example, the entity requesting a usage statistic makes a call to a get usage method of the metering service requesting some usage statistic(s). The following is an example of what the call to the get usage method may look like, and is not intended to be limiting:

vector<statisticValue>getUsage (StatisticDefinition inputStatistic . . . );

where inputStatistic is a statistic definition structure such as the exemplary structure described above, and statisticValue is a usage statistic value structure such as the exemplary structure described above. Note that getUsage( ) may return a vector including one or more usage statistic value structures. Further note that getUsage( ) may have one or more other parameters.

As an example, inputStatistic may be:
inpuStatistic={
SubscriberID='ABC123';
UsageType='storage';
Service='XYZ';
Operation='*'; //In this example, '*' indicates that the requestor is interested
//in all possible operation values
Period=pair ["hours", 24];
Type='rolling';
AnniversaryTime='2005-01-01 03:00:00';
};

An exemplary output of the call to getUsage( ) with the above inputStatistic structure may be a vector such as:
{
StatisticValue {outputStatistic1, 114.5},
StatisticValue {outputStatistic2, 2234.34}
}
where:
outputStatistic1={
SubscriberID='ABC123';
Time='2005-01-01 03:00:00';
UsageType='storage';
Service='XYZ';
Period=pair<24, "hours">;
Type='rolling';
Operation='ADD';
};
and
outputStatistic2={
SubscriberID='ABC123';
Time='2005-01-01 03:00:00';
UsageType='storage';
Service='XYZ';
Period=pair<24, "hours">;
Type='rolling';
Operation='UPDATE';
};

In other words, the output was split over the "Operation" field (since the input statistic left "Operation" unspecified), and one output statistic for operation "ADD" (with the value 114.5) and another output statistic for operation "UPDATE" (with the value 2234.34) were returned in the vector. This indicates that these two operations were the only ones used in the given period by the entity with the given SubscriberID for the service "XYZ" and the "storage" usage type. Note that if the inputStatistic had specified 'ADD' as the Operation, then only outputStatistic1 would have been returned in the vector.

Scaling

In one embodiment, there may be three primary aspects or dimensions in scaling the metering system, as described herein:

Detail throughput: how many usage records per second can the metering system handle?

Aggregate throughput: how many unique usage aggregates per day can the metering system handle?

Capacity: how many usage aggregates can the metering system store?

Growth in each of these dimensions may be managed differently. Note that a growth in detail throughput does not necessarily translate into a growth in aggregate throughput; for instance, a single subscriber that makes a large number of requests to the same service and operation generates a small amount of aggregate throughput, and increasing the request rate will not increase the aggregate throughput required.

Note that the following discussion refers to FIG. 3. One embodiment of the metering system may support multiple partitions 230, statically configured, each writing to a single database 228 pair. Another embodiment may support multiple database 228 pairs per partition 230. This may allow scaling to be performed indefinitely in all three dimensions.

Managing Detail Throughput

Increased detail throughput primarily affects the metering service 222 "layer" of the metering system. The metering service 222 layer may be scaled by adding more physical servers running instances of the metering service 222 component. In one embodiment, servers running instances of the metering service 222 may sit behind a network load balancer. This may allow the metering service 222 layer of the metering system to scale more or less linearly by adding hardware (e.g., new servers each running one or more instances of the metering service 222).

It is possible that detail throughput may become high enough to exceed the capabilities of the metering partitions 230. The partition 230 layer of the metering system may scale by adding a new partition 230, which may share an existing database 228 instance with an existing partition 230. Assuming that the partitioning is relatively even, this layer scales linearly in the number of partitions 230.

Managing Aggregate Throughput

Aggregate throughput primarily impacts the usage databases 228. In one embodiment, databases 228 may be implemented as MySQL databases. A MySQL database can only handle a certain amount of insert/update traffic. Note that other embodiments may use other types of databases, which may also be limited in the amount of insert/update traffic that can be handled.

To increase aggregate throughput, the number of database 228 pairs may be increased. This may require more partitions 230 to be added, if all partitions 230 already own a database 228 pair rather than sharing with another partition 230. Assuming that the partitioning is relatively even, this scales linearly in the number of database 228 pairs.

Managing Capacity

Capacity growth may impact the usage databases 228. As with aggregate throughput, capacity growth may be managed by adding more database 228 pairs. Assuming that the partitioning is relatively even, this scales linearly in the number of database 228 pairs.

Exemplary System

Figure 9:
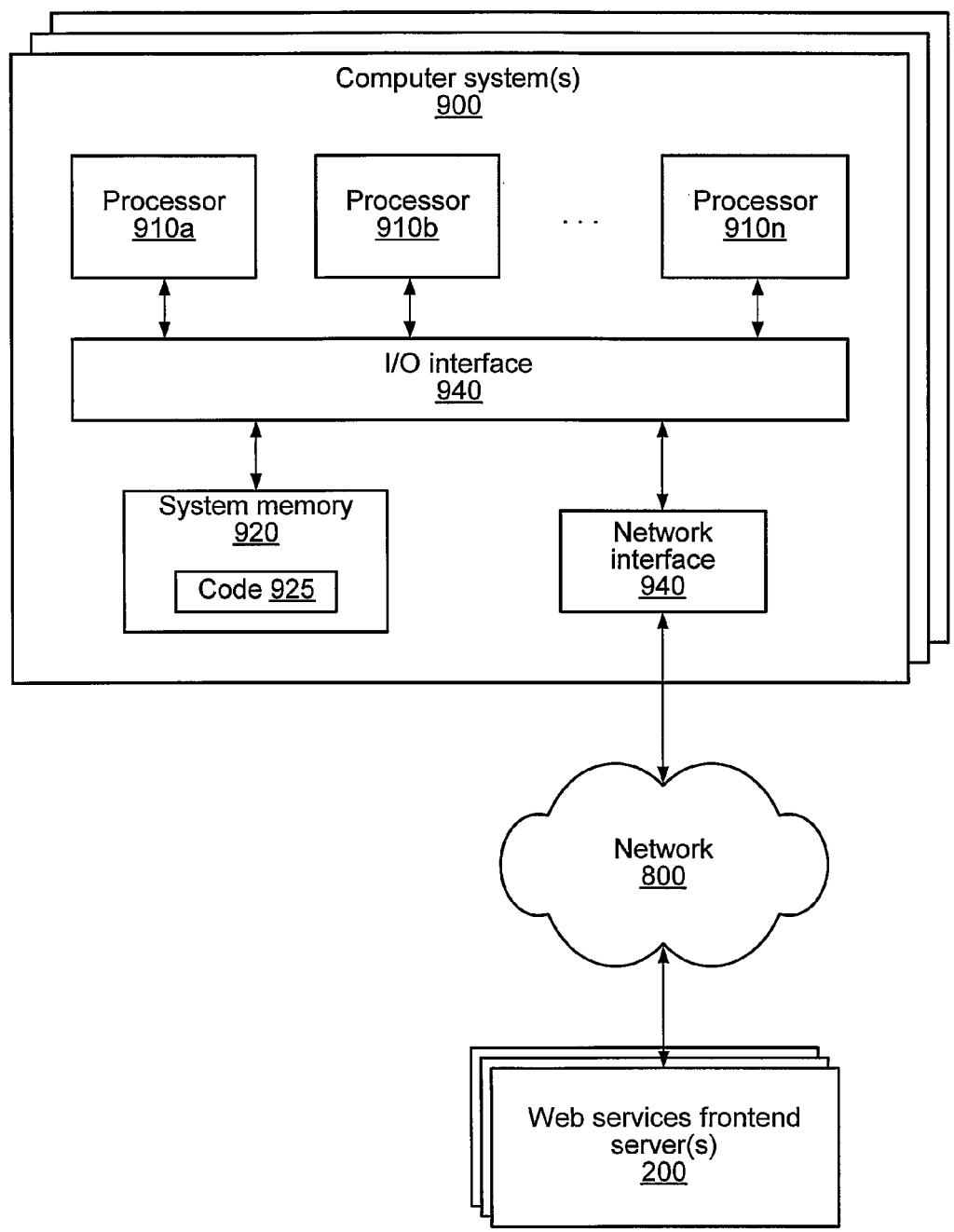
FIG. 9 is a block diagram illustrating an exemplary embodiment of a computer system on which embodiments may be implemented.

In one embodiment, a Web server that implements one or more components of a network services metering system as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for one or more components of Web services metering system, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 800. In particular, network interface 940 may be configured to allow communication between computer system 900 and other computer systems hosting components of the Web services metering system. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for implementing one or more components of a Web services metering system. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Exemplary Web Services

Embodiments of the network services metering system as described herein may be used to meter any type of Web service. The following describes some types of Web services as examples of Web services for which embodiments of the network services metering system may be used.

Some Web service providers may provide Web service interfaces to collections of data, such as product catalogs, through which Web service clients may access the data to be used, for example, on Web sites provided by the Web service clients. The Web service interface may provide APIs to search, retrieve, and potentially even update the Web service provider's data. For example, a Web service client may access product information in a product catalog through a Web services interface, and display links to or advertisements for those products for sale through the Web service client's Web site. The Web service provider may, for example, pay a commission to the Web service client for each item sold.

Another exemplary Web service is a queue Web service. In this Web service, a Web service provider may provide a Web service interface to an application that may allow Web service clients to create queues and to store data in and retrieve data from elements of the queues. The queues may be accessed and shared by two or more Web service clients, allowing the clients to store and/or exchange data via the Web service.

As an example, a queue Web service may be used to decouple components of an application so that the components may run independently, with the queue Web service easing messaging management between the components. Any component of a distributed application may store any type of data in a queue. Any other component or application may then later retrieve the data, using queue semantics. The queue may serve as a buffer between a work-producer that is saving the data, and a work-consumer that is retrieving the data for processing. Thus, the queue Web service may resolve issues that would otherwise arise if the producer were producing work faster than the consumer can process the work, or if the producer or consumer were only intermittently connected to the network.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    a processor; and
    a memory comprising program instructions, wherein the program instructions are executable by the processor to implement a plurality of aggregators each configured to:
        read usage information from a plurality of network service usage records in two or more usage batches from a corresponding one of a plurality of queue instances, wherein each usage batch comprises one or more network service usage records, wherein each network service usage record comprises usage information corresponding to a network service request to a particular network service, wherein the network service records are collected into a plurality of usage batches, and wherein a complete copy of each usage batch from the plurality of usage batches is enqueued in each of two or more of the plurality of queue instances;
        aggregate the usage information read from the plurality of network service usage records in the one or more usage batches according to one or more of the plurality of fields of the network service usage records to generate aggregated usage information;
        commit the aggregated usage information to a usage database;
        verify that the aggregated usage information has been successfully committed to the usage database; and
        dequeue the one or more usage batches from its corresponding queue instance in response to said verifying that the aggregated usage information has been successfully committed to the usage database, wherein said dequeue removes the one or usage batches from the corresponding queue instance.

2. The system as recited in claim 1, wherein each aggregator is further configured to commit the aggregated usage information to the usage database in accordance with a transactional database operation.

3. The system as recited in claim 1, wherein the network service is a Web service, wherein a Web service is a network service described in accordance with Web Services Description Language (WSDL).

4. The system as recited in claim 1, wherein each aggregator is further configured to store a unique usage batch identifier associated with each usage batch committed to the usage database.

5. The system as recited in claim 4, wherein, to commit the aggregated usage information to a usage database, each aggregator is further configured to:
    determine if a unique usage batch identifier associated with at least a portion of the aggregated usage information is stored in the unique usage batch identifiers of usage batches committed to the usage database;
    if the unique usage batch identifier associated with the at least a portion of the aggregated usage information is not stored in the unique usage batch identifiers, commit the at least a portion of the aggregated usage information to the usage database; and
    if the unique usage batch identifier associated with the at least a portion of the aggregated usage information is stored in the unique usage batch identifiers, dispose of the at least a portion of the aggregated usage information without committing the at least a portion of the aggregated usage information to the usage database.

6. The system as recited in claim 1, wherein each of the plurality of aggregators and its corresponding queue instance form a separate pipeline for processing batches of network service usage records into the usage database, wherein each pipeline corresponds to a database instance of the usage database, and wherein, to commit the aggregated usage information to a usage database, each aggregator is configured to commit the aggregated usage information to the database instance corresponding to its respective pipeline.

7. The system as recited in claim 1, wherein each network service usage record comprises:
    an identifier of an entity to which usage corresponding to the network service usage record is attributed;
    an identifier of a network service operation invoked by the network service request that generated the usage; and
    a value for the usage.

8. A system, comprising:
a processor; and
a memory comprising program instructions, wherein the program instructions are executable by the processor to implement a metering service configured to:
  receive network service usage records, wherein each network service usage record comprises usage information corresponding to a network service request to a particular network service;
  collect the network service usage records into a plurality of usage batches;
  enqueue a complete copy of each usage batch into each of two or more of a plurality of queue instances, wherein each queue instance is a head of a particular one of a plurality of pipelines for processing usage batches into a usage database;
  in each of the plurality of pipelines, aggregate usage information read from the network service usage records in the respective enqueued usage batches according to one or more of the plurality of fields of the network service usage records to generate aggregated usage information; and
  store the aggregated usage information to the usage database.

9. The system as recited in claim 8, wherein the metering service is further configured to:
receive queries for usage statistics from one or more entities in accordance with a get usage interface;
for each query:
  get usage statistics from the usage database that satisfy one or more criteria of the query; and
  return the usage statistics to an entity that submitted the query in accordance with the get usage interface.

10. The system as recited in claim 9, wherein each query comprises:
an identifier of an entity to which the requested query statistics are attributed;
a type of usage tracked by the requested usage statistic;
an identifier of a particular network service tracked by the requested usage statistic;
an identifier of a network service operation tracked by the requested usage statistic; and
a specification of a length of a time interval that the usage statistic is to be computed over.

11. The system as recited in claim 8, wherein the metering service is further configured to:
collect network service usage records into two or more usage batches each corresponding to a particular one of two or more partitions of the usage database, wherein each pipeline corresponds to one of the partitions; and
enqueue a complete copy of each of the two or more usage batches into at least one queue instance at the head of a pipeline for the partition corresponding to the pipeline.

12. The system as recited in claim 8, wherein the network service is a Web service, wherein a Web service is a network service described in accordance with Web Services Description Language (WSDL).

13. The system as recited in claim 8, wherein the metering service is further configured to assign a unique usage batch identifier to each usage batch, wherein the usage batch identifiers are used by the two or more pipelines when processing the usage batches into the usage database to prevent duplication of usage information in the usage database.

14. The system as recited in claim 8, wherein the metering service is further configured to, in each of the plurality of pipelines,
commit the aggregated usage information to a database instance of the usage database corresponding to the pipeline.

15. The system as recited in claim 14, wherein, to commit the aggregated usage information to a database instance, the metering service is configured to:
determine that a unique usage batch identifier associated with at least a portion of the aggregated usage information is not in previously stored unique usage batch identifiers of usage batches committed to the usage database; and
in response to said determining, commit the at least a portion of the aggregated usage information to the database instance.

16. The system as recited in claim 8, wherein each network service usage record comprises:
an identifier of an entity to which usage corresponding to the network service usage record is attributed;
an identifier of a network service operation invoked by the network service request that generated the usage; and
a value for the usage.

17. A method, comprising:
performing, on one or more computers:
  receiving network service usage records, wherein each network service usage record comprises usage information corresponding to a network service request to a particular network service;
  collecting the network service usage records into a plurality of usage batches;
  enqueueing a complete copy of each usage batch into each of two or more of a plurality of queue instances, wherein each queue instance is a head of a particular one of a plurality of pipelines for processing usage batches into a usage database;
  in each of the plurality of pipelines, aggregating usage information read from the network service usage records in the respective engueued usage batches according to one or more of the plurality of fields of the network service usage records to generate aggregated usage information; and
  storing the aggregated usage information to the usage database.

18. The method as recited in claim 17, further comprising:
receiving queries for usage statistics from one or more entities in accordance with a get usage interface;
for each query:
  obtaining usage statistics from the usage database that satisfy one or more criteria of the query; and
  returning the usage statistics to an entity that submitted the query in accordance with the get usage interface.

19. The method as recited in claim 17, further comprising:
collecting network service usage records into two or more usage batches each corresponding to a particular one of two or more partitions of the usage database, wherein each pipeline corresponds to one of the partitions; and
enqueueing a complete copy of each of the two or more usage batches into at least one queue instance at the head of a pipeline for the partition corresponding to the pipeline.

20. The method as recited in claim 17, wherein the network service is a Web service, wherein a Web service is a network service described in accordance with Web Services Description Language (WSDL).

21. The method as recited in claim 17, further comprising assigning a unique usage batch identifier to each usage batch, wherein the usage batch identifiers are used by the two or more pipelines when processing the usage batches into the usage database to prevent duplication of usage information in the usage database.

22. The method as recited in claim 17, wherein wherein the method further comprises, in each of the plurality of pipelines, committing the aggregated usage information to a database instance of the usage database corresponding to the pipeline.

23. The method as recited in claim 22, wherein said committing the aggregated usage information to a database instance comprises:

determining that a unique usage batch identifier associated with at least a portion of the aggregated usage information is not in previously stored unique usage batch identifiers of usage batches committed to the usage database; and in response to said determining, committing the at least a portion of the aggregated usage information to the database instance.

\* \* \* \* \*